(No Model.)

H. BREIDING.
HARROW.

No. 456,329. Patented July 21, 1891.

Witnesses
C. C. Burching
H. P. Wilson

Inventor
Henry Breiding
per John G. Manahan
his Atty.

UNITED STATES PATENT OFFICE.

HENRY BREIDING, OF STERLING, ILLINOIS.

HARROW.

SPECIFICATION forming part of Letters Patent No. 456,329, dated July 21, 1891.

Application filed April 7, 1891. Serial No. 387,956. (No model.)

*To all whom it may concern:*

Be it known that I, HENRY BREIDING, a citizen of the United States, residing at Sterling, in the county of Whiteside and State of Illinois, have invented certain new and useful Improvements in Harrows; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has reference to improvements in harrows of the class in which the teeth are optionally used in a vertical position or sloped obliquely to the rear; and the objects of my improvements are, first, to construct them in such form that the implement may be drawn substantially in the line of its teeth-beams and its teeth oscillated and adjustably locked in the line of movement; second, to permit the teeth to be folded entirely back out of engagement with the earth as a convenience in transportation or in passing over or turning upon meadow or other land which it is desired to not disturb; third, to utilize the upper portion of the teeth as ways within which to pivot and reciprocate the longitudinal bars which oscillate the teeth.

The disadvantage in folding the teeth pivoted upon bars perpendicular to the line of movement has been that the slope of the teeth lowered the teeth-bars so nearly to the surface of the ground that cornstalks, sod, and other impediments gathered more or less in the front of the teeth-beams, thus impeding the operation of the implement, and the same was true to some extent even when the teeth in the cross-bar harrow were used in a vertical position, as frequently the ground was so mellow that the teeth penetrated it to a degree to bring the cross-bars nearly or quite in contact with the surface of the ground and gather obstacles in front of said beams.

I attain the purposes of my invention by the mechanism illustrated in the accompanying drawings, in which—

Figure 1:
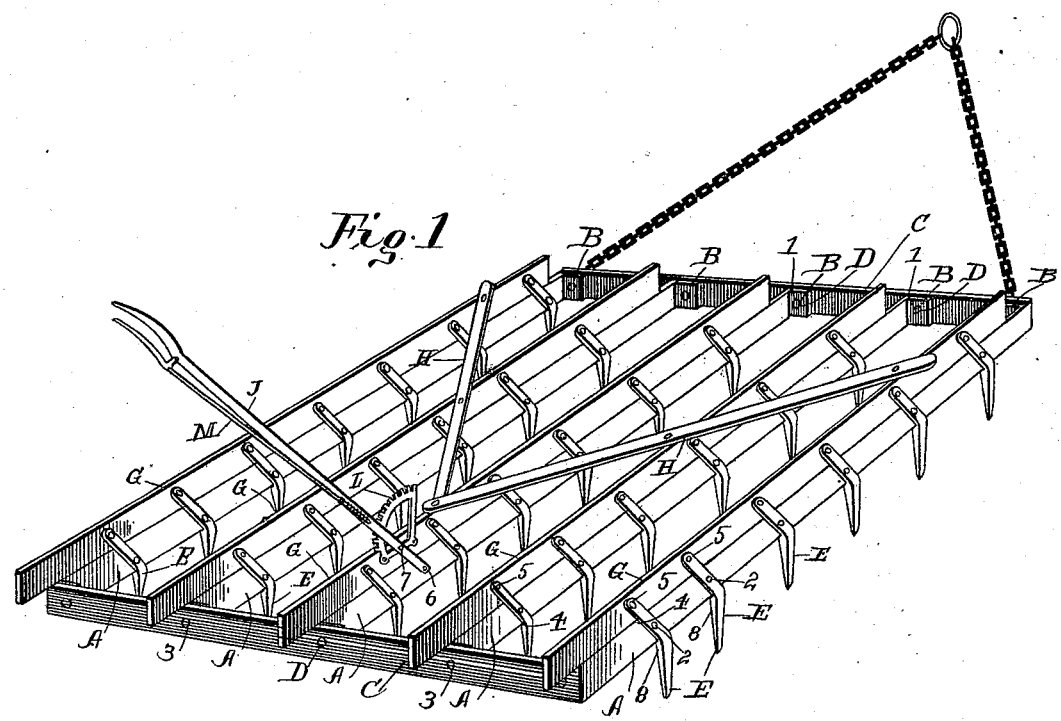
Figure 2:
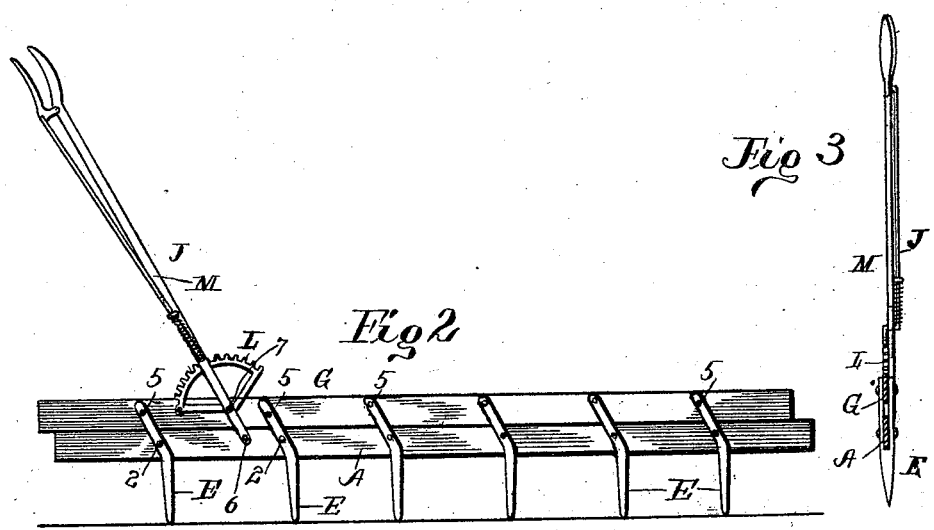
Figure 3:
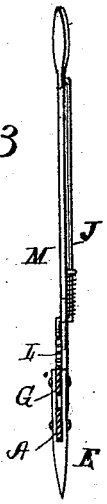

Figure 1 is a perspective of an implement embodying my invention. Fig. 2 is a side elevation of one of the tooth-bars thereof, showing the tooth in its vertical position, with its other positions indicated in dotted lines. Fig. 3 is a detail in cross-section of the place and mode of attachment of one of the teeth and the mode of seating lever J.

Similar letters and figures refer to similar parts throughout the several views.

My implement is adapted to be used in one section or in various sections, attached to and drawn by the ordinary draw-bar; but, as my invention is similarly embodied in each section, I do not deem it necessary to show or describe more than one section.

The harrow may be constructed of any desired number of tooth-beams; but I have illustrated and will describe the construction of five beams, which will be found to be an entirely satisfactory number.

A A are the tooth-beams, seated substantially in the line of draft, and which can be placed parallel or slightly divergent at one end, as may be desired, in either case the draft being diagonal to said beams in the necessary degree to prevent the teeth from tracking. The beams A consist, simply, of bars of steel placed edgewise, with a small portion B of each end thereof bent laterally at right angles with the main body of the bars, with suitable bolt-holes 1 in the portions B and tooth pivot-holes 2 at suitable intervals in the main portion thereof.

The main frame of the harrow is constructed by simply attaching the end plates C C to the respective ends of the beams A by means of suitable holes 3, formed in said end plates at the proper localities, through which attaching-bolts D project through the openings 1 in the parts B of said beams, the parts B abutting flatly against the inner surface of the plates C. The rigidity of the parts B effects a very strong and substantial brace, and said parts are located out of any possibility of obstructing the passage of loose material under the harrow.

E E are the harrow-teeth, which are preferably cast of malleable iron, and about midway of their entire length have their lower portion bent backward at an angle 8 with their upper portion of about one hundred and thirty-five degrees. The upper portion of the teeth E is bifurcated longitudinally, creating an interval 4, equaling in width the thickness of the teeth-bars A. The latter bar is seated in said interval about midway of the latter, and the tooth E is pivoted on said bar by means of transverse bolts F.

G G are the tooth-adjusting bars, which are also made of a straight steel plate somewhat narrower than the tooth-beam A. The plates G are pivotally seated edgewise in the upper portion of the interval 4 of the teeth E, directly above and parallel with the tooth-beams, respectively, by means of cross-bolts 5 passed transversely through the upper end of the teeth E and loosely through a conforming hole in the plates G. The relation of the respective pivotal seats of the beam A and plate G in the interval 4 of the teeth E is such that when the plates G are thrown to the limit of their backward movement the operative portion of the teeth E is vertical and the plate G rests upon the beam A, and when the plates G are thrown to their forward limit the operative portion of the teeth E is thrown back about horizontal, and the plates G again rest upon the upper surface of the beam A. Coincident movement of all of the plates G is secured by diagonal steel braces H, secured at their front divergent ends to the outer plates G, near the front ends of the latter, and which converge at their rear ends to meet upon and be there attached to the center plate G and intermediately attached to the intermediate plates G. All of these attachments can be effected by an eyebolt or clip suitably attached to the respective plates G and bolted to the bars H in any suitable manner. The plates G are reciprocated and the angle of the teeth E with the ground adjusted as desired by means of a hand-lever J, pivoted at its lower end to the center beam A at 6 and to the imposed plate G at 7. The pivotal seats 6 and 7 of the lever J have the same mutual relation and distance as the pivotal seats 2 and 5 of each of the teeth E. Therefore all of the movement imparted to said lever at its said pivotal locality is communicated in like degree to the teeth E.

A toothed sector L, rigidly seated on the center plate G and adapted to be engaged optionally by the usual spring-pawl M on the lever H, holds the lever J, and thereby the teeth E, in any desired position. When the teeth E are thrown back for the purpose of clearing the harrow of any accumulation, the movement being in the line of the beams A, the latter readily ride over such accumulations and permit them to pass out at the rear end of the harrow. By means of the lever J the teeth E can be used in a vertical position or at any degree of backward slope desired, or can be thrown back entirely out of operation.

What I claim as my invention, and desire to secure by Letters Patent of the United States, is—

1. The combination of the teeth E, provided with the angle 8 and opening 4, the beams A and plates G, pivotally seated, respectively, in said openings, and means, substantially as shown, for reciprocating and locking said plates in the line of said beams, substantially as shown, and for the purpose described.

2. The combination of the teeth E, provided with the angle 8 and upper opening 4, the beams A and plates G, pivotally seated, respectively, in said openings, connecting-bars H, and actuating and locking lever L, adapted to oscillate the teeth E and hold them in any desired position, substantially as shown, and for the purpose described.

In testimony whereof I affix my signature in presence of two witnesses.

HENRY BREIDING.

Witnesses:
JOHN G. MANAHAN,
ADDA E. WARD.